March 5, 1946. D. M. PHILLIPS 2,396,123
FLUID CONDUCTING SWIVEL JOINT
Filed March 16, 1942 2 Sheets-Sheet 1

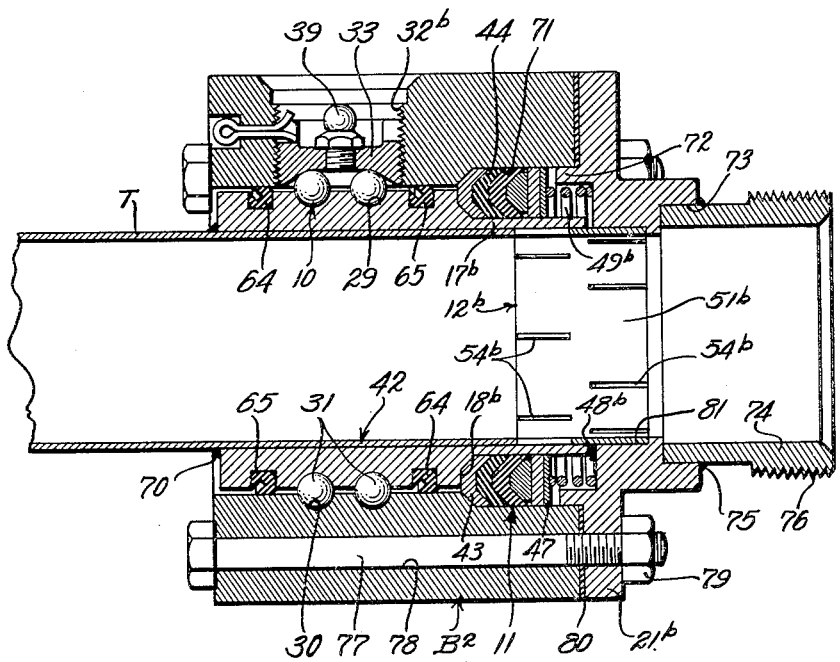
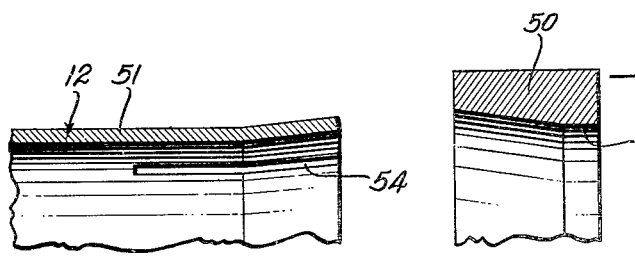

Patented Mar. 5, 1946

2,396,123

UNITED STATES PATENT OFFICE 2,396,123

FLUID CONDUCTING SWIVEL JOINT

Dwight M. Phillips, Fullerton, Calif., assignor to Chiksan Tool Company, Brea, Calif., a corporation of California Application March 16, 1942, Serial No. 434,876

8 Claims. (Cl. 285—97.3)

This invention relates to joints and connections and relates more particularly to swivel joints or swing joints for pipes, conduits, and other fluid handling members. A general object of the invention is to provide practical, effective and long wearing fluid conducting swivel joints.

Another object of this invention is to provide a fluid conducting swivel joint embodying sturdy dependable anti-friction means connecting the joint sections for relative turning.

Another object of the invention is to provide a fluid conducting swivel joint embodying effective long wearing sealing means for preventing the leakage of fluid from between the relatively turnable sections, said sealing means being spring loaded or spring actuated to remain effective and fluid tight indefinitely.

Another object of this invention is to provide a fluid conducting swivel joint characterized by simple novel means for maintaining a complete adequate electrical connection between the relatively turnable joint sections.

Another object of this invention is to provide a fluid conducting swivel joint of the character referred to in which the sealing means and electrical connecting means are easily made accessible for inspection, repair and replacement.

A further object of this invention is to provide a fluid handling swivel joint that is small, compact and light in weight and, therefore, well adapted for employment on vehicles, aircraft, machines, and the like, where these characteristics are of importance.

The various objects and features of my invention will be fully understood from the following detailed description of typical preferred forms and applications of my invention, throughout which description reference is made to the accompanying drawings, in which:

Fig. 1 is a central longitudinal detailed sectional view of one form of swivel joint of the invention. Fig. 1ª is an enlarged fragmentary sectional view of the contact tube. Fig. 1ᵇ is an enlarged fragmentary sectional view of the contact ring. Fig. 2 is a view similar to Fig. 1 showing another form of the invention and Fig. 3 is a view similar to Fig. 1 illustrating still another form of the invention.

The present invention may be embodied in forms for use in various situations and for the handling of different classes of fluids. In the drawings I have shown three typical forms of the invention, it being understood that the invention is not to be construed as limited or restricted to the specific embodiments disclosed.

The form of the invention illustrated in Fig. 1 may be said to comprise, generally, two sections A and B related for relative turning, means 10 connecting the sections for relative turning and rotation, means 11 for sealing between the sections A and B and means 12 for maintaining an electrical connection between the sections A and B.

The sections A and B are arranged in mating or telescopic relation and form a unit that is adapted to be connected in a fluid line, or the like. The sections A and B are preferably both tubular members, the section A being the inner element of the connection and the section B being the outer member. The inner section A is preferably cylindrical and is formed at its outer end for connection with a pipe or tubing and its inner end is shaped to carry the sealing means 11. In the case illustrated, the outer portion of the section A is reduced in external diameter and has a socket or counter bore 13 which receives a reduced end part 14 of a tube 15. The tube 15 is shouldered to engage the end of the section A and welding or brazing 16 at the shoulder fixes the tube 15 to the section A and provides a fluid seal between the tube and section. The inner end portion 17 of the inner section A is reduced in external diameter leaving or providing a radial external shoulder 18 on the section. It will be observed that the inner section A is a simple readily formed element.

The section B surrounds or telescopes over the major portion of the section A. The tubular outer section B presents a cylindrical internal surface 19 which surrounds the section B with suitable clearance. The section B may be of uniform internal diameter throughout its length. The outer end portion of the section B is preferably of enlarged external diameter. A flange or flange member 20 is secured to the outer end of the section B. The flange 21 of the member 20 has a gasket seal with the end face of the section B. In the form of the invention shown in Fig. 1 screws 22 are passed through openings 23 in the flange 21 and are threaded into openings or sockets 24 in the enlarged end portion of the section B to secure the flange member 20 to the section B. The member B extends radially inward at the inner end of the section A and the opening 25 in the member 20 may be of the same diameter as the fluid opening in the tubular inner section A. An annular rib or flange 9 is provided on the inner face of the member 20 and fits within the section B to locate or center the flange member on the section B. The outer portion of the member 20 is prepared to receive or connect with a pipe or tubing. In the construction illustrated a socket or counter bore 26 is provided in the member 20 to receive the end portion of a tube 27 and the tube is welded or brazed to the member 20 at 28 to secure the tube to the member and to provide a fluid seal between these parts.

The means 10 connects the sections A and B for relative rotation or turning and is a simple dependable anti-friction means which positively holds the sections against relative axial movement and displacement while offering a minimum of resistance and friction to relative turning of the sections. The means 10 includes one or more spaced annular raceways 29 formed in the periphery of the section A and complementary raceways 30 formed in the wall of the opening 19 of the section B. In the case illustrated there are two spaced sets of raceways 29 and 30. Series of anti-friction members or balls 31 occupy the sets of raceways 29 and 30. The balls 31 serve to support the section B clear of the section A to prevent direct contact between the sections at any point. The raceways 29 and 30 are of substantial depth each having a cross section only slightly less than 180° in extent so that the cooperation of the balls 31 with the walls of the raceways is extensive to assure the long life of the swivel connection and to positively prevent axial movement between the sections. It will be seen how the spaced series of balls 31 engaged in the raceways 29 and 30 maintain the sections A and B in the correct axial alignment making it unnecessary for the sections to have engaging surfaces at any point.

A lateral or radial opening 32 is provided in the wall of the section B to join or interrupt the raceways 30. The opening 32 is provided to facilitate the insertion of the balls 31 and the removal of the balls. A plug 33 normally closes or occupies the opening 32. The inner end of the plug 33 has pitched or curved walls 34 cooperating with the balls 31 to retain the balls in the raceways 29 and to assist in the transmission of end forces between the sections. The plug 33 is locked or keyed against unthreading in a position where the walls 34 are retained in correct relation to the series of balls 31. A diametric notch 35 is provided in the outer end of the plug 33 and a cotter key 36 is arranged through an axial opening 37 in the section B to cooperate with the notch 35. It is believed that it will be apparent how the balls 31 may be readily assembled in the raceways 29 and 30 prior to the introduction of the plug 33 into the opening 32. To disconnect the coupling or to replace broken or worn balls 31, the cotter key 36 is removed and the plug 33 is unthreaded from its opening 32 whereupon the balls 31 are caused or allowed to pass out through the opening.

It is preferred to incorporate lubricating means in the swivel joint to lubricate the means 10. In the construction illustrated a longitudinal opening 38 is provided in the plug 33 and a lubricant fitting or grease gun fitting 39 is threaded in the opening 38 to communicate with the interior of the section B. It will be seen that lubricant supplied to the fitting 39 under pressure is delivered to the interior of the section B to lubricate the raceways 29 and 30 and the balls 31. The outer end of the plug 33 is inset from the outer face of the section B and the outer surface of the plug may be recessed. The exposed end portion of the grease gun fitting 39 may thus be entirely received in the opening 32 and need not project from the external surface of the section B. It may be found desirable or necessary to provide added material around the opening 32 to give the opening sufficient depth. Thus, as illustrated in Fig. 1, the outer surface of that portion of the section B which is provided with the opening 32 has its outer surface flush with the peripheral surface of the enlarged end portion of the section B.

It is preferred to provide means for sealing between the section A and B to prevent the outward leakage of lubricant from between the sections and to prevent the inward passage of dirt and foreign matter. In the form of the invention being described this means includes an annular groove 40 formed in the periphery of the section A at a point beyond or outward of the raceways 29. The groove 40 preferably has flat walls and may be substantially rectangular in cross section. A sealing ring 41 is provided in the groove 40. The sealing ring 41 may be formed of rubber, synthetic rubber, or the like. The sealing ring 41 conforms to the groove 40 and is preferably under compression so that its outer face effectively seals with the wall of the opening 19 in the section B. An annular groove 42 is provided in the ring 41. The groove 42 is diagonal, having its mouth or outer end at the outer corner of the ring 41 and, extending inwardly toward the opposite corner of the ring. Thus, the mouth of the groove 42 is open to the clearance space between the sections A and B and faces outwardly toward the ends of the sections A and B.

The packing or sealing means 11 operates to prevent the leakage of fluid under pressure from between the sections A and B. The packing means 11 surrounds the reduced end portion 17 of the inner section A and comprises a series of ring elements. An inner ring 43 of brass, or the like, seats against the shoulder 18. The inner ring 43 is chevron shaped in cross section having a concave outer face defined by outwardly divergent wings whose extremities engage with the surface of the portion 17 and the wall of the opening 19. Two or more chevron type sealing rings 44 of synthetic rubber, or the like, are arranged one against the other with the innermost ring 44 bearing against the metal ring 43. The lips or wings of the sealing rings 44 seal with the external surface of the portion 17 and with the wall of the opening 19 in the section B. An outer follower ring 45 of brass, or other appropriate material, seats against the concave face of the outermost sealing ring 44. The outer face of the metal ring 45 is flat and a lubricant retaining ring 46 of felt, or other suitable material, is arranged against the ring 45. The ring 46 engages or packs with the surface of the portion 17 and the wall of the opening 19 to prevent the inward leakage of lubricant. A follower ring 47 of steel or other rigid material bears against the outer face of the lubricant retaining ring 46.

The assembly of the several rings 43 to 47 is held under compression and is constantly urged inwardly to remain effective as a dependable fluid tight seal. It is to be observed that the end of the inner portion 17 of the section A is spaced from the inner side of the member 20. Thus there is an annular space 48 at the end of the portion 17 putting the interior of the section B in communication with the fluid handling line so that the pressure of the fluid being handled is applied to the sealing ring assembly. It will be apparent how the fluid pressure acting against the follower ring 47 serves to actuate and compress the sealing rings 44 assuring an effective sealing engagement with the wall of the opening 19 and the periphery of the portion 17. The invention further includes mechanical means for compressing and actuating the sealing ring assembly. A spring 49 is arranged under compression between the inner side of the member 20 and the follower ring 47. The ring 49 holds the assembly of the several rings 43 to 47, inclusive, in place under all conditions of operation and assists in actuating the sealing rings 44. The flange or rib 9 of the member 20 assists in centering and locating the spring 49.

The means 12 maintains a dependable and adequate path for the flow of electric current between the sections A and B. The means 12 includes a contact ring 50 on one section and a tube 51 on the other section for engaging the ring. In the case illustrated the ring 50 is carried by the member 20, while the tube 51 is carried by the section A. A socket 52 is provided in the inner side of the member 20 to contain the contact ring 50. The ring 50 is formed of stainless steel or other appropriate conductive material. The ring 50 has a tapered or flared internal surface portion and a cylindrical internal surface 53. The extent or length of the surface 53, which is the active contact surface, may be varied by varying the length of the tapered surface portion. The tube 51 is formed of copper or other selected conductive material and is press fitted or otherwise secured in a counter bore formed in the longitudinal opening of the section A. The tube 51 extends beyond the end of the portion 17 and enters the ring 50. In practice the tube 51 may extend to the outer extremity of the ring 50. A plurality of spaced longitudinally extending slots 54 is provided in the projecting end portion of the tube 51 to define resilient fingers. Prior to assembling the joint the fingers flare outwardly, see Fig. 1ª. When the joint is assembled these resilient fingers remain in full contact with the surface 53 of the ring. The slots 54 serve to maintain the space 48 and the interior of the section B in communication with the fluid line and further render the projecting portion of the tube resilient so that it remains in frictional and electrical contact with the contact ring 50. It will be observed that the tube 51 remains in full effective cooperation with the ring 50 but that this cooperation offers a minimum of resistance to relative rotation between the sections A and B. The surface 53 may be wide or narrow as conditions may require. When the surface 53 is narrow there is little more than line contact between the tube 51 and the contact ring and, therefore, very little friction.

The form of the present invention illustrated in Fig. 2 may be said to comprise, generally, two sections A' and B', means 10 connecting the sections A' and B' for relative rotation, means 11 for sealing between the sections A' and B', and means 12ª for maintaining an electrical connection between the sections A' and B'.

The section A' is a simple elongate tubular member which may be of uniform internal diameter throughout its length. The section A' may be of uniform external diameter except for the reduced end portion 17ª which carries the sealing means 11. In the particular application of the invention illustrated the section A' is arranged over the end portion of a tube T and is secured and is sealed with the tube T by welding or brazing 16ª. The tube T may terminate adjacent the plane occupied by the shoulder 18ª.

The section B' is a tubular member enclosing or surrounding the section A'. The section B' preferably surrounds the section A' with substantial clearance so that there is no direct engagement between the two sections. In this form of the invention one end of the section B' is provided with a radially extending flange 60 having openings 61 to facilitate its mounting or attachment. The other end of the section B' is enlarged in external diameter to receive or carry the flange member 20ª. The flange 21ª of the member 20ª is secured to the enlarged end portion of the section B' by spaced screws 22ª. A suitable sealing gasket 62 is engaged between the opposing faces of the flange 21ª and the section B'. The member 20ª is formed or equipped to make connection with a pipe, tubing, or other fluid handling element. In the particular case illustrated, the cylindrical hub portion of the member 20ª has an external thread 63 for receiving a collar coupling, or the like.

The means 10 may be substantially the same as described in the preceding form of the invention, that is, it may comprise two series of balls 31 received in registering races 29 and 30 in the sections A' and B', respectively. The section A' has a radial opening interrupting the races 30 to facilitate the insertion of the balls 31 and this opening is closed by the threaded plug 33 equipped with the lubricant fitting 39, all as described in the preceding form of the invention. The balls 31 cooperating with the grooves or races 29 and 30 support the section B' entirely clear of the section A' and it is desirable in some instances to provide gaskets or sealing rings to seal between the sections at opposite sides of the means 10. In the construction of Fig. 2 annular grooves 64 are provided in the section A' at opposite sides of the means 10 and gaskets or sealing rings 65 are provided in these grooves to seal with the interior of the section B'. These gaskets or sealing rings 65 may be of the same character as the ring 41, described above. The sealing rings 65 serve to prevent the entrance of dirt and other material between the sections A' and B' and retain the lubricant in the means 10.

It is important to note that the two gaskets or sealing rings 65 face in the same or corresponding direction. As described above in connection with the gasket or ring 41, each ring 65 has a diagonal groove entering it from one corner and the rings are shaped or formed so that they tend to spread or expand and thus effectively seal with the interior of the section B' The grooves of the rings 65 face radially outward and rearwardly or toward the outer end of the section A'. With the grooves of the two rings 65 facing in this direction the section A' may be telescoped into the section B' without causing the rings to catch or engage in the grooves or races 30 of the section B'. In other words, the grooves of the ring 65 being in the trailing corners of the rings allow the gaskets or rings to freely slide past the races 30. The direction or disposition of the grooves in the rings 65 is also important in connection with the sealing functions and actions of the rings. The innermost sealing ring 65 has its diagonal groove facing toward the bearing means 10 and is thus effective in preventing lubricant from the means 10 from reaching the pipe line to dilute the fluid. If there is an excessive quantity of lubricant in the bearing means 10 or if the lubricant expands, the innermost ring 65 catches or stops the lubricant and prevents it from reaching the fluid handling line. On the other hand, the outermost ring 65 is so positioned that it permits the escape or discharge of excessive lubricant from the joint. The diagonal groove of the outermost ring 65 faces away from the bearing means 10 and excess lubricant from the bearing means is free to escape past the outermost sealing ring. It is to be observed that both sealing rings 65 are effective in preventing the inward passage or leakage of foreign matter into the joint.

The sealing means 11 may be the same as illustrated in Fig. 1 comprising the assembly or series of rings 43 to 47, inclusive, engaged on the reduced portion 17$^a$ of the inner section A'. In this form of the invention the outer section B' is enlarged in internal diameter or has a counter bore 66 for partially receiving the packing ring assembly. The inner ring 43 bears against the shoulder 18$^a$ and the shoulder or inner wall of the counter bore 66. A spring 49$^a$ is arranged under compression between the inner side of the member 20$^a$ and the follower ring 47 to maintain the sealing ring assembly in position and to compress or actuate the sealing rings. Fluid pressure from the fluid line is admitted to the interior of the section B' through the space 48$^a$ between the inner side of the member 20 and the end of the section A'. This fluid pressure acts on the follower ring 47 to actuate or compress the sealing assembly.

The means 12$^a$ for maintaining electrical contact between the sections A' and B' includes a contact tube 51$^a$. The tube 51$^a$ is secured or held in one section and contacts or engages in the other section. In the case illustrated the tube 51$^a$ is arranged or secured in the section A' with its end in abutment with the end of the tube T and the tube projects beyond the reduced portion 17$^a$ of the section A' to extend into the member 20$^a$ of the section B'. The portion of the tube 51$^a$ which extends into the member 20$^a$ is preferably received in a socket or counter bore 67 of the member 20$^a$. The tube 51$^a$ may be held between the bottom wall of the counter bore 67 and the end of the tube T so that it is restrained against longitudinal movement. That portion of the tube 51$^a$ which projects beyond the portion 17$^a$ is provided with circumferentially spaced longitudinal slots 54$^a$. The slots 54$^a$ maintain the space 48$^a$ and the interior of the section B' in communication with the fluid line so that the fluid pressure is applied to the packing ring assembly. The portions or fingers between the slots 54$^a$ remain in extensive contact with the member 20$^a$ by reason of their resiliency. The tube 51$^a$ has extensive contact with the section A' and with the member 20$^a$ for the full dependable transmission of current flow through the swivel connection.

The swivel connection illustrated in Fig. 3 comprises, generally, two telescopically related sections A$^2$ and B$^2$, means 10 connecting the sections for relative rotation, sealing means 11 for sealing between the sections and means 12$^b$ for maintaining an electrical connection between the sections.

The section A$^2$ may be substantially the same as the section A' illustrated in Fig. 2, being an elongate tubular member having the reduced end portion 17$^b$ at its inner end. The tube T enters the section A$^2$ and extends a considerable distance into the section. The section A$^2$ may be connected with the tube T by welding or brazing 70 which also seals between the tube and section.

The section B$^2$ is in the form of a cylindrical tubular block of uniform external diameter and uniform in internal diameter except for the counter bore 71, which partially receives the packing means 11. The flanged end member 20$^b$ may be substantially the same as the members 20 and 20$^a$ described above. The flange 21$^b$ of the member 20$^b$ opposes the end of the section B$^2$ and may be of the same external diameter as the section B$^2$. The end rib or flange 72 of the member 20$^b$ engages within the counter bore 71. The member 20$^b$ is suitably conditioned for connection with a pipe, tube, or the like. In the case illustrated a counter bore 73 in the hub portion of the member 20$^b$ receives a coupling part 74. Brazing or welding 75 may secure the coupling part 74 with the member 20$^b$ and may seal between the same. The coupling part 74 may have an external thread 76 for mating with a pipe thread or coupling part thread. In this form of the invention the member 20$^b$ is secured to the section B$^2$ by bolts 77 which pass through spaced longitudinal openings 78 in the section B$^2$. The heads of the bolts 77 engage against the exposed end of the section B$^2$ and nuts 79 are threaded on the opposite end portions of the bolts to clamp against the flange 21$^b$. A suitable gasket 80 may be engaged between the flange 21$^b$ and the end of the section B$^2$.

The means 10 may be the same as described above comprising two rows of balls 31 engaged in registering raceways 29 and 30 in the sections A$^2$ and B$^2$. A radial opening 32$^b$ in the wall of the section B$^2$ interrupts the raceways 30 to permit the insertion of the balls 31 and the opening 32$^b$ is closed by the plug 33 which has the grease gun fitting 39, as above described. Sealing gaskets or rings 65 are set in grooves 64 spaced at opposite sides of the means 10 to seal between the sections A$^2$ and B$^2$ to retain the lubricant in the means 10 and to prevent the passage of foreign matter particles between the sections.

The sealing means 11 may be the same as above described comprising the assembly of rings 43 to 47, inclusive. This series of rings is engaged on the reduced portion 17$^b$ of the section A$^2$ and bears inwardly against the shoulder 18$^b$ and the inner wall of the counter bore 71. The sealing rings 44 engage and seal with the external surface of the part of the portion 17$^b$ and the wall of the counter bore 71 to prevent the leakage of fluid pressure from between the sections A$^2$ and B$^2$. The packing assembly is actuated and maintained active by a spring 49$^b$ arranged under compression between the inner side of the member 20$^b$ and the follower ring 47. The sealing means is also actuated by the fluid pressure admitted through the space 48$^b$ to the interior of the section B$^2$.

The means 12$^b$ includes a contact tube 51$^b$. The tube 51$^b$ is engaged within the section A$^2$ to abut against the end of the tube T and the contact tube 51$^b$ extends beyond the end of the section A$^2$ to project into a counter bore 81 provided in the member 20$^b$. The tube 51$^b$ is held against endwise movement through its engagement with the end of the tube T and the bottom wall of the counter bore 81. Spaced longitudinal slots 54$^b$ are provided in the opposite end portions of the tube 51$^b$. The slots 54$^b$ in the opposite end of the tube 51$^b$ are circumferentially staggered or offset so that they do not unduly weaken the tube. The slots 54$^b$ in the outer end portion of the tube 51ᵇ may be of sufficient length to have communication with the space 48ᵇ so that the interior of the section B² is in direct communication with the pipe line. The tube 51ᵇ is closely fitted in the section A² and counter bore 81 to maintain full effective electric contact with the same.

It is believed that the utility and practicability of the swivel coupling of this invention will be readily understood from the foregoing detailed disclosure. The two sections of the coupling are dependably connected for free relative turning and rotation by the means 10, the means 10 offering a minimum of friction to relative rotary movement. The sealing means 11 maintains a complete fluid seal between the two sections indefinitely. The sealing means is spring actuated to remain effective at all times and the spring serves to take up the wear in the sealing means giving the assembly a longer life. In the event that it becomes necessary or desirable to inspect, repair, or replace the sealing means the same is readily made accessible. In the structure of Fig. 1 it is only necessary to unthread and remove the screws 22 and withdraw the member 20 to make the sealing means fully accessible. The same is true in the case of Fig. 2 where removal of the screws 22ᵃ permits disconnection of the member 20ᵃ to expose the sealing elements. In Fig. 3 the nuts 79 are unthreaded and the member 20ᵇ is retracted to make the sealing means accessible. The couplings are strong and long wearing and yet are light in weight and very compact.

Having described typical preferred forms and applications of my invention, I do not wish to be limited or restricted to the specific details herein set forth, but wish to reserve to myself any variations or modifications that may appear to those skilled in the art or fall within the scope of the following claims.

Having described my invention, I claim:

1. A fluid conducting swivel coupling comprising two tubular body sections in telescopic relation, means connecting the sections for free relative rotation and holding the sections against relative axial movement, means for preventing the leakage of fluid from between the sections, and means for maintaining an electrical connection between the sections, the last named means including a tube of conducting material engaging within the two sections to have its internal surface flush with the internal surfaces of the sections.

2. A fluid conducting swivel coupling comprising two tubular body sections in telescopic relation, means connecting the sections for free relative rotation and holding the sections against relative axial movement, means for preventing the leakage of fluid from between the sections, and means for maintaining an electrical connection between the sections, the last named means including a tube of conductive material engaged in one section and having a slotted portion engaging in and contacting the other section, the internal surface of the tube being substantially flush with the internal surfaces of the sections to leave an unobstructed and unrestricted passage through the coupling.

3. A fluid conducting swivel joint to be connected between two fluid handling parts comprising an inner tubular section whose outer end is formed for connection with a fluid handling part, the inner end portion of the inner section being reduced in external diameter, an outer section surrounding the inner section, the sections having registering raceways, anti-friction elements in the raceways connecting the sections for free rotation, sealing rings on said reduced end portion sealing between the sections, a member detachably secured to the outer section and formed for connection with the other fluid handling part, said member being spaced from the inner end of the inner section, and an electric contact tube engaged in the inner section and having a slotted portion engaged in the member, the slots of the member passing fluid pressure to the interior of the outer section to act on the sealing rings.

4. A fluid conducting swivel coupling comprising two tubular body sections in telescopic relation, means connecting the sections for free relative rotation and holding the sections against relative axial movement, means for preventing the leakage of fluid from between the sections, and means for maintaining an electrical connection between the sections, said means including a contact ring inset in the internal wall of one section having an internal surface of limited area, and a conducting tube in the other section engaging said surface, the internal surface of said tube being flush with the internal surfaces of the sections.

5. A fluid conducting swivel coupling comprising two tubular body sections in telescopic relation, means connecting the sections for free relative rotation and holding the sections against relative axial movement, means for preventing the leakage of fluid from between the sections, and means for maintaining an electrical connection between the sections, said means including a contact ring inset in the internal wall of one section having an internal surface, and a conducting tube engaged in the other section and having resilient fingers engaging said surface, the internal surface of said tube being flush with the internal surfaces of the sections.

6. A fluid conducting swivel coupling comprising two tubular body sections in telescopic relation, means connecting the sections for free relative rotation and holding the sections against relative axial movement, means for preventing the leakage of fluid from between the sections, and means for maintaining an electrical connection between the sections including a tube of conductive material having its end portions engaging in said sections, said end portions being longitudinally slotted to form contact parts.

7. A tubular swivel joint including two tubular sections in telescopic relation, anti-friction means connecting the sections for free relative rotation tnd holding the sections against relative axial movement, packing means for sealing between the inner and outer sections, a flange member detachably secured to the outer section, and means for maintaining an electrical connection between the sections, the sealing means and the last named means being accessible upon detachment of the flange member.

8. A tubular swivel joint including two tubular sections in telescopic relation, anti-friction means connecting the sections for free relative rotation and holding the sections against relative axial movement, packing means for sealing between the inner and outer sections, a flange member detachably secured to the outer section, and means for maintaining an electrical connection between the sections including a contact ring on the flange member, and a tube in the inner section cooperating with the ring.

DWIGHT M. PHILLIPS.